:::::::::::::::::::::::::::::::::::::::::::::::::::::::::::::::::::

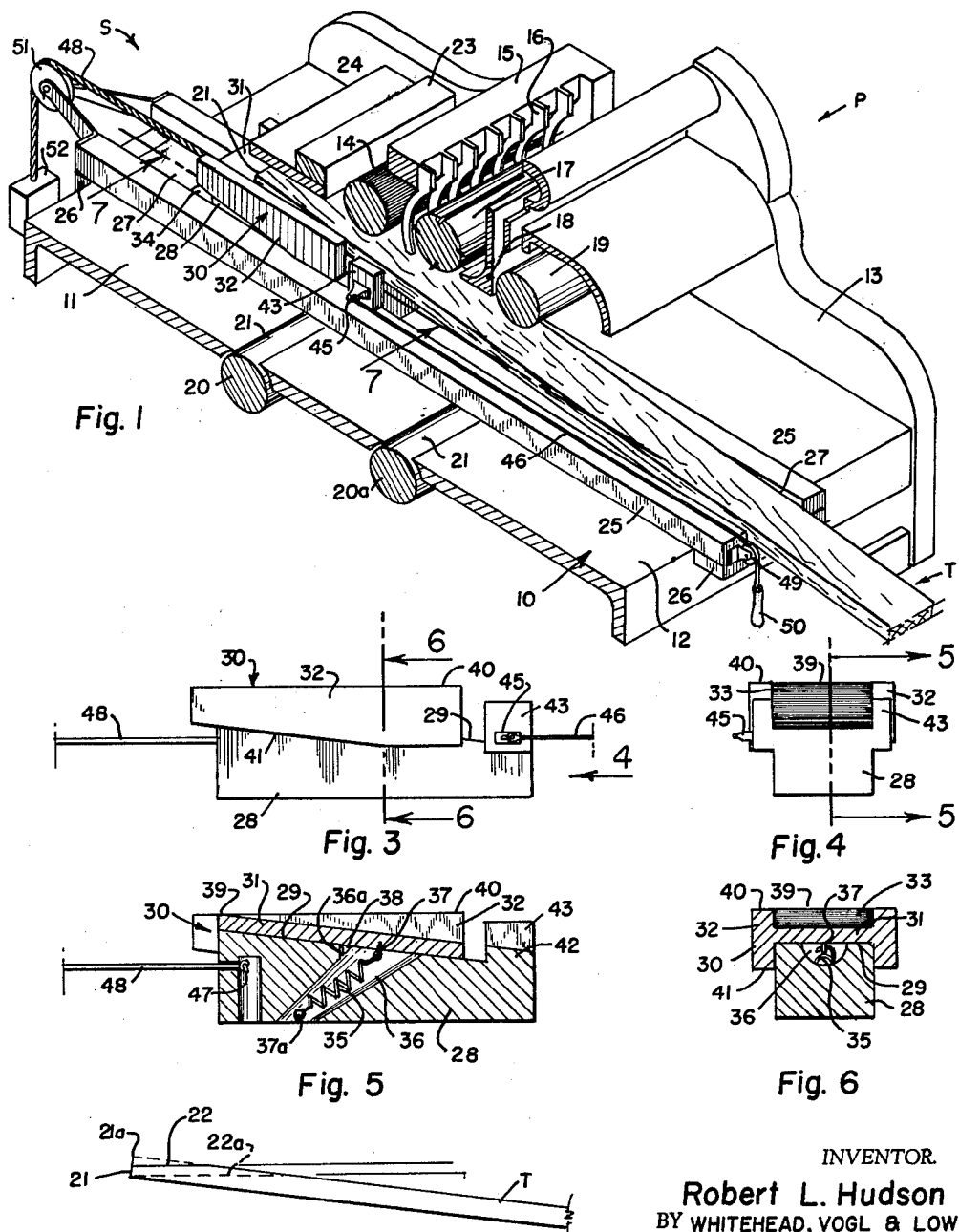

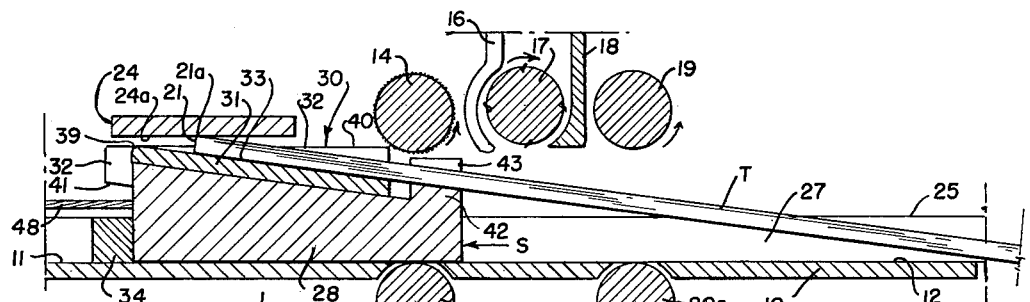

United States Patent Office 3,133,567
Patented May 19, 1964

3,133,567
SCARFING ATTACHMENT FOR CUTTING SCARF
JOINTS IN DIMENSION LUMBER
Robert L. Hudson, Evergreen, Colo.
(Box 66, Littleton, Colo.)
Filed Nov. 15, 1962, Ser. No. 237,910
7 Claims. (Cl. 144—127)

This invention relates to apparatus for forming scarf joints in lumber and more particularly to scarfing attachments for wood-working machinery. The present invention is a development from, and an improvement over my previous application for scarfing attachment for the finishing of rough cut scarf joints in dimension lumber, filed December 12, 1960, Serial No. 75,415 which shall issue as Patent No. 3,063,482 on November 13, 1962.

The objects of that invention which are incorporated in the present invention, are to provide a novel and improved scarfing attachment for a planer, of the general type which includes an overhead cutter and powered feed rolls at each side of the cutter, which: (a) is adapted to finish scarf joints precisely at a selected pitch; (b) permits a rough-cut scarf joint at an end of a timber to be finished as a smooth-surfaced, accurately-pitched scarf by a single pass through the planer; (c) uses the normal cutting and feeding actions of the planer to obtain a self-feeding, semi-automatic scarf-finishing operation requiring only a single operator to handle the material as it is fed into and out of the planer; (d) is adapted to be quickly and easily affixed to or removed from a planer and does not require any attentions or adjustments to the planer which would interfere with the regular uses of the planer; (e) is a simple, economical, easily-operated, rugged and durable unit; and (f) is especially adapted for use in smaller woodworking plants which need to produce scarf joints but cannot afford to invest in more elaborate and far more expensive, conventional types of scarfing machines.

In the unit described in the previously-filed application, the primary operation of the scarfing attachment permitted a rough-cut scarf joint to pass through the planer by the pressure and movement of the feed rolls of the planer bearing against the surface of the scarf joint. At least one of the feed rolls, the infeed roll or outfeed roll, must always bear against the scarf joint to accomplish this. This restricts the use of the invention to timbers of greater thickness than that which may be desired. Thinner timbers, which are so thin that the distance between the heel and point of the scarf is less than the spacing between the infeed and outfeed driving rolls of the planer, cannot be used. Nevertheless, there is also a need for scarfing thinner timber.

Therefore, a further object of the present invention is to provide a novel and improved scarfing attachment for a planer which automatically feeds itself through the planer without relying upon the pressure of feed rolls against the scarf face of the timber to initiate the feeding operations and thereby permit the scarfing of comparatively thin boards.

Another object of the present invention is to provide a novel and improved scarfing attachment for a planer which is especially adapted to permit the cutting of finished scarf joints of accurate pitch in dimension lumber without the need of providing rough cut scarf joints preliminary to the scarfing operations through the planer.

Another object of the present invention is to provide a novel and improved scarfing attachment for a planer which is equally well adapted to permit the cutting of a finished scarf joint at the end of a piece of dimension lumber with or without a preliminary rough-cut scarf joint and when used without the preliminary rough-cut scarf joint to finish the scarf joint with a minimum of pass through the planer.

With the foregoing and other objects in view all of which more fully hereinafter appear, my invention comprises certain novel and improved construction, combinations, and arrangements of parts and elements as hereinafter described, defined in the appended claims, and illustrated in the accompanying drawing in which:

FIGURE 1 is an isometric sectional view of a planing machine, of the type herein considered and herein referred to as a planer, having the improved scarfing attachment mounted thereon with the necessary accessories thereto mounted upon the machine and with a square-end timber being positioned in the scarfing-attachment guides, preliminary to moving it in the machine for the first pass of a scarf-forming operation.

FIGURE 2 is a side view of end piece of dimensional lumber or timber illustrating a partially cut scarf thereon, and the original square-end of the timber and a finally cut scarf in dashed lines to point out that the scarf joint is formed in the machine by several passes.

FIGURE 3 is a side elevational view of the block portion of the improved scarfing attachment.

FIGURE 4 is an end elevational view of the block as viewed from the indicated arrow 4 at FIG. 3.

FIGURE 5 is a longitudinal, sectional, elevational view of the block as taken from the indicated line 5—5 at FIG. 4.

FIGURE 6 is a transverse sectional, elevational view as taken from the indicated line 6—6 at FIG. 3.

FIGURE 7 is a fragmentary sectional, elevational view of portions of the planer and of the scarfing attachment thereon as taken substantially from a vertical plane extending through the indicated line 7—7 at FIG. 1 but illustrating a square-ended timber as being inserted into the planer and in position to commence a scarf-finishing operation.

FIGURE 8 is a view similar to FIG. 7 but showing the scarf-cutting operation as being partially completed.

FIGURE 9 is a view similar to FIG. 7 but showing the completion of a pass in the scarf finishing operation.

FIGURE 10 is a view similar to FIG. 7 but illustrating the timber as having been ejected from the machine and the scarfing block returning to the original position, with portions of the block dropping underneath the guiding fingers of the planing machine.

The art of splicing sections of lumber by gluing scarfed ends together is well known, and a number of machines have been developed for the specific purpose of cutting scarfs in ends of timbers. Also, attachments have been developed for planes and jointers for forming scarf joints. Some types of specially constructed scarfing machines are capable of a substantial production of accurate scarf cuts and such machines are indispensable in large lumber mills where scarf-cutting is a full-time operation. However, such machines are quite expensive and are altogether too costly for many smaller lumber mills and mills which require only occasional scarf cutting operations. On the other hand, the common scarf-cutting attachments for planes and jointers are essentially hand tools and while satisfactory, if a few cuts are to be made, they are not suitable for any competitive production. Each cut requires too much time to finish.

It follows that there is a real and definite need for a scarfing attachment which may be used with the woodworking machinery available in most mills and which permits scarfs to be finished on a production basis, and which is competitive with larger mills having specialized machinery. With such in view, the present invention was conceived and developed and comprises, in essence, a scarf-finishing attachment for a conventional power-feed planer which is adapted to receive the end of a piece of lumber having a rough-cut scarf thereon and to precisely finish this scarf as fast as the material can be moved through the planar by its feed rolls. This attachment gives the small shop a means of producing precisely cut scarfs rapidly and accurately with an absolute minimum investment in equipment.

Referring more particularly to the drawing, FIG. 1 thereof shows my improved scarfing attachment S mounted in a planer P, which is of a conventional type that may be found in most wood shops. This planer P is shown somewhat diagrammatically and in section to illustrate only its primary operative elements and to better illustrate the manner in which the attachment S is mounted on the table 10 of the planer. In ordinary use, rough-cut dimension lumber is placed on this table 10, at the infeed end 11 thereof to move longitudinally therethrough, and to be discharged from the outfeed end 12 thereof. This table lies between longitudinally disposed framework members 13 which upstand from each side thereof to support transversely disposed feeding, holding, and cutting elements over the table. The position of these transversely-disposed elements is normally fixed and the elevation of the table surface may be varied with respect to the frame members to adjust the table to any selected thickness of finished material.

These feeding, holding, and cutting elements include, in sequence, at least one spring-mounted, power-driven infeed roll 14 which is adapted to bear down and upon a piece of lumber or timber to grip it and to push it into the cutting elements and across the table. Next in sequence, is a transversely disposed chip breaker support frame 15 having a plurality of spaced chip-breaker fingers 16 depending therefrom to bear down upon a timber fed therein. Next, in sequence, is a planer cutter head 17 which is powered to rotate rapidly to plane the top surface of the timber moving through the planer.

The infeed roll 14 and chip breaker fingers 16 are spring mounted between the longitudinal frame members to yield vertically, while the cutter head is affixed to the frame and at a selected distance above the table. Therefore, the infeed roll and fingers will yield to conform to a varying thickness of a rough-cut timber passing through the planer while the fixed cutter head will plane the timber to the selected thickness, depending upon the adjustment of the table beneath the cutter.

The next element in sequence is a pressure bar 18 which is maintained at the same level as the cutter-head cutting surface and is on the outfeed side of the cutter head. The final element in the sequence is at least one power-driven outfeed roll 19 which rotates to push material out of the planer. This roll is also spring mounted and bears resiliently against the finished lumber surface to hold it down the same as the infeed roll 14 except its surface is smooth so that it will not corrugate or otherwise mar the finished surface of the freshly planed lumber.

The table surface is smooth to provide a free sliding action of material thereon. Preferably most planers will also include at least one lower infeed roll 20 and at least one lower outfeed roll 20a which are mounted in the table in suitable transverse slots 21 below the respective upper infeed and outfeed rolls. All of these feed rolls are power driven and are synchronized to rotate in unison to assure smooth movement.

In using the improved scarfing attachment, it is contemplated that standard dimension lumber, illustrated as a timber T, will be scarfed at its end. The scarf will always be at a selected pitch for subsequent fitting operations with other like-scarfed timbers. The end of the timber T may be prepared for the scarfing operation by rough-cutting as described in my former application; however, with the presently-described improved scarfing attachment, the timber may be left with a square-cut end 21 and the scarfing operation may be accomplished by several passes through the machine. FIG. 2 illustrates a timber T having a partially cut scarf face 22 as will be obtained by a first pass through the apparatus to remove the point 21a of the end of the timber, the point being shown in broken lines. This figure also illustrates, in broken lines, a finished scarf 22a which may be obtained by a second or subsequent pass through the apparatus. It is to be noted that the number of the passes through the planer to obtain a finished scarf joint will depend upon the thickness of the timber and also upon the permissible depth of a cut by the planer. Thin boards will require only a single pass and thicker boards will require several passes.

To restrict the depth of a cut by the planer, a transversely disposed spacer beam 23 is conventionally mounted over the table ahead of the infeed roll 14 and with its undersurface being at a height slightly above the cutting plane of the cutter head 17. This limits the thickness of boards ordinarily fed into the planer and thereby prevents the infeed roll 14 and fingers 16 from being lifted an excessive height. This spacer beam 23 is used in combination with the present improved scarfing attachment to limit the height at which the point 21a can be above the partially cut scarf face 22 and to prevent excess lift of the infeed roll and fingers 16. The spacer beam 23 also limits the thickness of other subsequent cuts as from the face 22 to the face 22a and determines the number of passes through the machine which will be required for a complete scarfing operation. In order to take full advantage of this spacing means, the conventional spacer beam 23 is preferably modified by an extension 24 to provide a comparatively wide, smooth undersurface 24a which is adequate to contact the points 21a of boards of various thicknesses and also to contact partially cut faces, all as will hereinafter become apparent. To cut a scarf on a timber at a selected pitch, the scarfing attachment S moves longitudinally through the machine within a longitudinal guide means. This means may include a pair of spaced, longitudinally-disposed guide bars 25 which extend from each end of the table 10 and are held in position by short transversely-disposed lock bars 26 at the underside of each end of the guide bars. The lock bars 26 abut against each vertical end of the table to hold the guide bars 25 in position in spaced parallelism with the guide bars forming a channel 27 wherein the scarfing attachment S moves.

The channel 27 is as wide as, or wider than the timbers which will be scarfed, so as to slidably receive a timber T from the outfeed end of the table as illustrated in FIG. 1. The body of the scarfing attachment is formed as a wedge-shaped gage block 28 having a width such as to slidably fit in the channel 27. The top surface of this block slopes downwardly in the direction of movement at an angle corresponding to the pitch of the scarf. It is adapted to hold a shifting head 30 which is generally H-shaped in section with an inclined web portion 31 between side flanges 32. The web portion of this head is slidably mounted upon the top surface 29 to provide an inclined holding surface 33 paralleling the surface 29 whereon the end portion of a timber rests when being scarfed.

The combined height of the block 28 and the thickness of the web 31 is such that when at a fully retracted position, the infeed end of the planer, as established by a stop 34, between the guide bars 25 the projection of the inclined holding surface 33 of the shifting head web will be above the outfeed edge of the table 10 of the planer; thus, when a timber is properly placed upon the holding surface 33, the board will not be inclined downwardly to a position where it will strike the outfeed edge of the table as clearly illustrated at FIGS. 1 and 7. It is contemplated that the inclined top surface of the gage block 28 and the holding surface 33 will be suitably conditioned to frictionally hold together under pressure and to hold a board placed thereon when cutting operations are under way. On the other hand, the undersurface and sides of the gage block will be smooth and finished so that it will easily move along the table and in the channel 27, with the assistance of the lower feed rolls 20 and 20a.

In the initial position of operation of the scarfing attachment, the gage block 28 abuts against the stop 34, and the shifting head 30 is pulled upwardly along the inclined top surface 29 to a position of maximum elevation. This pulling of the shifting head upon the gage block is accomplished by an inclined tension spring 35 carried within a socket 36 in the block 28 with one end of the spring being affixed to a connector 37 at the underside of the web 31 of the shifting head and the other end of the spring being affixed to a connector 37a in the socket 36 of the block. The spring 35 is inclined in such a manner as to pull the shifting head 30 upwardly along the inclined surface 29 and at the same time to hold the two members together. To stop this upward pull of the shifting head, a suitable lug 38 depends from the underside of the shifting head web 31 to abut against an edge 36a of the socket 36, all as clearly illustrated at FIG. 5.

In this position of maximum elevation, the peak 39 of the inclined web 31 of the shifting head is at the elevation of the cutting plane of the cutter head 17 of the planer. Also, the upper surfaces 40 of the side flanges 32 are at this level. On the other hand, the position of the lower surfaces 41 is not critical. They may be at any slight elevation below the block top surface 29 to facilitate holding the shifting head in place upon the block, and yet clear the guide bars 25.

To complete the scarfing attachment, the lower end of the block 28 may include a short inclined raised portion 42 to present a short continuation of the surface 33 and short sidewall portions 43 having upper surfaces well below the surfaces 40 to avoid interference with the planer feed rolls and chip breaker fingers. A lug 45 outstands from one sidewall 43 to connect with a starter pull-string 46. A socket-connection 47, or any similar connection, is located at the trailing end of the block 28 for connection with a retracting cord 48. The starter pull-string 46 extends towards the outfeed side of the unit as over a guide bar, and it may be turned downwardly at the outfeed end of the planer as over a pulley 49 to terminate as a simple gripping handle 50. The retracting cord 48 extends towards and over the infeed side of the planer as over a pulley 51 for connection with a weight 52 or equivalent spring means which automatically operates to pull and retract the scarfing block to its initial position against the stop 34 when not being otherwise pulled through the machine.

Certain steps in operating this scarfing attachment are illustrated at FIGS. 7–10, where the first pass of a timber through the machine is shown. It is to be noted that the length of the upper surfaces 40 of the flanges 32 are such that the flanges will contact both the infeed and outfeed rolls at the same time; also, that the stop 34 is positioned sufficiently forwardly towards the infeed edge of the planer as to permit the upper surface to be forwardly of and out of contact with the infeed roll 14 but underneath the spacer extension 24, as in the manner clearly illustrated at FIG. 7. When in this initial position with the shifting head at maximum elevation, a timber T is fed into the machine from the outfeed side of the machine to be placed upon the holding surface 33 until its end corner 21a abuts against the under surface 24a of the spacer beam extension as shown at FIG. 7.

The next step is to initiate the planing operation by pulling the starter pull-string 46 until the upper surfaces 40 of the flanges 32 contact the infeed roll 14. Thence, the infeed roll 14, and its opposing lower roll 20 take over and commence to move the block through the apparatus with the infeed roll 14 moving first along the surfaces 40, and thence over the timber point 21a. The fingers 16 are also raised by the timber point 21a while the cutter head 17 commences the scraf cutting operation, all as clearly illustrated at FIG. 8.

As the scarf cutting commences, the surfaces 40 have passed under the outfeed rolls to continue movement of the scrafing attachment when the surfaces leave the infeed rolls. This movement is thus continued until the attachment has moved completely past the outfeed roll as illustrated at FIG. 9. At this time the pressure of the feed rolls is released from the shifting head 31 and the timber T is also released from its position upon the surface 33. The scarfer is then ready for retraction to its initial position.

This retraction is automatically effected by the pull of the retracting cord 48 and when the surfaces 40 successively contact the outfeed roll, the fingers 16 and infeed roll 14, the shifting head 30 is pulled downwardly along the block surface 29 to clear and pass underneath these overhead members without resistance. When the attachment is fully returned to the stop 34, the shifting head 30 is then returned to its position of maximum elevation by the action of the spring 35 and the apparatus is ready for a second pass of the timber through the planer in the same manner as above described.

It is to be noted that with this arrangement a comparatively wide and narrow plank or timber, or even a plyboard sheet may be effectively and accurately scarfed. While the timber is always held in position upon the inclined surface 33, either by the infeed or outfeed roll, or by the fingers 16 or pressure bar 18, the actual feeding movements are by the powered feed rolls bearing against the surfaces 40 of the shifting head 30. At the same time upon retraction, these surfaces 40 collapse for they are pulled below the rolls and fingers to avoid jamming of the apparatus and also contact with the rotating cutting head. The scarfing operations are also accomplished by a single operator at the outfeed end of the planer in a fast, accurate and efficient manner.

I have now described my invention in considerable detail, however, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. In combination with a planer of the type having a table, a cutter head mounted over the table transversely to the normal longitudinal direction of forward material movement across the table to define a cutting plane above and in spaced parallelism with the table, an infeed roll mounted along side and at the infeed side of the cutter head adapted to press upon and to push material on the table forwardly and into the cutter, and an outfeed roll mounted alongside and at the outfeed side of the cutter adapted to press upon and to pull material on the table forwardly and through the cutter, a scarfing attachment for planing a scraf cut at the end of a timber, comprising:
    (a) a longitudinally disposed guide means mounted upon the table,
    (b) a gage block mounted upon the table and on the guide means for movement therealong with the top surface of the block being sloped downwardly from the trailing end thereof with respect to the normal direction of material movement,
    (c) a shifting head slidably mounted on the gage block having a longitudinal inclined web member with a timber-holding surface sloping downwardly from a peak point adjacent to the trailing end of the block at an inclination of a selected scarf pitch and having a longitudinal flange with an upper surface which lies in spaced paralellism with the planer at the level of said peak point,
    (d) means for resiliently holding the shifting head at a top position on the sloping top surface of the gage block where said peak point and flange upper surface lie in said cutting plane and for permitting the shifting head to shift downwardly along the sloping top surface of the gage block to drop below said cutting plane, (e) means for retracting and holding the block at an initial position at the infeed side of the table with the leading end of the flange upper surface being out of contact with the infeed roll, and, (f) means for initiating forward movement of the block until the flange top surface contacts and is gripped by the infeed roll, whereby, with a timber lying on the flange holding surface when the infeed roll grips the flange upper surface it moves the block through the planer to plane a scarf cut on the timber and continues such movement until the flange-holding surface is moved past the outfeed roll, whereupon the pressure on the shifting head is released and the said retracting means pulling against the block pulls the shifting head down the sloping block surface to permit the block to pass under the rolls and return to the initial position where said resilient holding means returns the shifting head to the said top position.

2. In the combination defined in claim 1 wherein the slope of the top surface of the gage block is substantially the same as the slope of the web timber-holding surface.

3. In the combination defined in claim 1, wherein the movement initiating means consists of a pull cord extending to the outfeed side of the table.

4. In the combination defined in claim 1, wherein the shifting head includes a pair of flanges with a flange being at each side of the web and with the lower edges of the flanges overhanging the sides of the block.

5. In the combination defined in claim 1, wherein the holding means includes an inclined spring within the block connected to the undersurface of the shifting head.

6. In the combination defined in claim 1, wherein the retracting means includes a stop on the guide means adjacent to the infeed side of the planer.

7. In the combination defined in claim 1, including a transverse spacer beam at the infeed side of the table having its under surface a short distance above said cutting plane and being substantially over said initial position of the block, whereby to limit the depth of cut of a timber placed on said holding surface.

References Cited in the file of this patent

UNITED STATES PATENTS 3,063,482     Hudson _____ Nov. 13, 1962